(12) United States Patent
Hayasaka et al.

(10) Patent No.: US 9,283,552 B2
(45) Date of Patent: Mar. 15, 2016

(54) METHOD FOR PRODUCING AVIATION FUEL OIL BASE AND AVIATION FUEL OIL COMPOSITION

(75) Inventors: Kazuaki Hayasaka, Tokyo (JP); Hideki Ono, Tokyo (JP); Akira Koyama, Tokyo (JP); Hideshi Iki, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 1052 days.

(21) Appl. No.: 13/391,727

(22) PCT Filed: Aug. 30, 2010

(86) PCT No.: PCT/JP2010/064724
§ 371 (c)(1),
(2), (4) Date: May 4, 2012

(87) PCT Pub. No.: WO2011/025002
PCT Pub. Date: Mar. 3, 2011

(65) Prior Publication Data
US 2012/0216449 A1 Aug. 30, 2012

(30) Foreign Application Priority Data
Aug. 31, 2009 (JP) .................... 2009-200918

(51) Int. Cl.
| | | |
|---|---|---|
| C07C 1/00 | (2006.01) | |
| B01J 29/74 | (2006.01) | |
| B01J 23/883 | (2006.01) | |
| C10G 3/00 | (2006.01) | |
| C10G 45/64 | (2006.01) | |
| C10L 1/04 | (2006.01) | |
| B01J 23/85 | (2006.01) | |
| B01J 29/85 | (2006.01) | |

(52) U.S. Cl.
CPC ............ *B01J 29/7484* (2013.01); *B01J 23/883* (2013.01); *B01J 29/7461* (2013.01); *B01J 29/7492* (2013.01); *C10G 3/46* (2013.01); *C10G 3/49* (2013.01); *C10G 3/50* (2013.01); *C10G 45/64* (2013.01); *C10L 1/04* (2013.01); *B01J 23/85* (2013.01); *B01J 29/85* (2013.01); *C10G 2300/1014* (2013.01); *C10G 2300/1018* (2013.01); *C10G 2300/202* (2013.01); *C10G 2400/08* (2013.01)

(58) Field of Classification Search
CPC ................ C10G 3/46; C10G 2300/10; C10G 2300/1003; C10G 2300/1007; C10G 2300/1011; C10G 2300/1014; C10G 2300/1048; C10G 2400/08; C10G 45/00; C10G 45/06; C10G 45/12
USPC .......................................... 585/240
See application file for complete search history.

(56) References Cited

U.S. PATENT DOCUMENTS

| | | |
|---|---|---|
| 4,300,009 A | 11/1981 | Haag et al. |
| 4,992,605 A | 2/1991 | Craig et al. |
| 5,766,274 A | 6/1998 | Wittenbrink et al. |
| 6,669,743 B2 | 12/2003 | Wittenbrink et al. |
| 7,232,935 B2 | 6/2007 | Jakkula et al. |
| 7,846,323 B2 * | 12/2010 | Abhari et al. .................. 208/57 |
| 7,928,273 B2 * | 4/2011 | Bradin ........................... 585/14 |
| 7,968,757 B2 | 6/2011 | Abhari et al. |
| 8,039,682 B2 * | 10/2011 | McCall et al. ................ 585/240 |
| 8,143,469 B2 | 3/2012 | Koivusalmi et al. |
| 2002/0005009 A1 | 1/2002 | Wittenbrink et al. |
| 2003/0158272 A1 * | 8/2003 | Davis et al. .................. 518/719 |
| 2004/0230085 A1 | 11/2004 | Jakkula et al. |
| 2008/0092436 A1 | 4/2008 | Seames et al. |
| 2008/0244962 A1 | 10/2008 | Abhari et al. |
| 2009/0158637 A1 | 6/2009 | McCall et al. |
| 2010/0043279 A1 | 2/2010 | Abhari et al. |
| 2011/0071327 A1 | 3/2011 | Abhari et al. |
| 2011/0196179 A1 | 8/2011 | Bradin |
| 2011/0308142 A1 * | 12/2011 | Abhari et al. .................. 44/307 |
| 2012/0198757 A1 * | 8/2012 | Koyama ......................... 44/307 |
| 2012/0209038 A1 | 8/2012 | Iguchi et al. |

FOREIGN PATENT DOCUMENTS

| | | |
|---|---|---|
| CN | 101321847 | 12/2008 |
| EP | 1 396 531 | 3/2004 |
| EP | 2130895 | 12/2009 |

(Continued)

OTHER PUBLICATIONS

Search Report issued with respect to patent family member European Patent Application No. 10812048.6, mailed Feb. 6, 2013.

(Continued)

*Primary Examiner* — Nina Bhat
(74) *Attorney, Agent, or Firm* — Greenblum & Bernstein, P.L.C.

(57) ABSTRACT

A method for producing an aviation fuel oil base, including: a first step of obtaining a first generated oil by hydrotreating a feedstock by bringing a feedstock which includes an oxygen-containing hydrocarbon compound derived from an animal or vegetable oils and fat into contact with a first dual functional catalyst which has dehydrogenation and hydrogenation functions and which includes a metal of group 6B of the periodic table, a metal of group 8, and an amorphous solid acidic substance, in the presence of hydrogen; and a second step of obtaining a second generated oil including an aviation fuel oil base by hydroisomerizing the first generated oil by bringing the first generated oil into contact with a second dual functional catalyst which has dehydrogenation and hydrogenation functions and which includes a metal of the group 8 of the periodic table and a crystalline solid acidic substance, in the presence of hydrogen.

9 Claims, No Drawings

(56) References Cited

FOREIGN PATENT DOCUMENTS

| | | |
|---|---|---|
| GB | 2355725 | 5/2001 |
| JP | 2005-154647 | 6/2005 |
| JP | 2007-308565 | 11/2007 |
| JP | 2007-308566 | 11/2007 |
| JP | 2007-308569 | 11/2007 |
| JP | 2007-332360 | 12/2007 |
| JP | 2008-239876 | 10/2008 |
| JP | 2008-291274 | 12/2008 |
| JP | 2009-1722 | 1/2009 |
| JP | 2009-161669 | 7/2009 |
| WO | 2007-063874 | 6/2007 |
| WO | 2008/117856 | 10/2008 |
| WO | 2008/153160 A1 | 12/2008 |

OTHER PUBLICATIONS

James D Kinder et al., "Evaluation of Bio-derived Synthetic Paraffinic Kerosenes (Bio-SPK)," Jun. 1, 2009.

Osman Ilke Senol, "Hydrogenation of Aliphatic and Aromatic Oxygenates on Sulphided Catalysts for Production of Second Generation Biofuels," Jan. 1, 2007.

Search Report for Application No. PCT/JP2010064700, Received on Apr. 23, 2013.

"Database WPI Week 200743 Thompson Scientific, London, GB; AN-2007-446113," XP002695219, Jun. 7, 2007.

Tadahide, Sone, "Technique for Production of Bio Hydro-Fined Diesel (BHD)", Material Stage, vol. 7, No. 11, Feb. 2008, pp. 73-78 along with a partial English translation thereof.

Office Action for Japanese Application No. 2009-200695, mailed on May 14, 2013.

Office Action for Japanese Application No. 2009-200777, mailed on May 14, 2013.

Donald A. Bea, "Jet Fuels need more Kerosine", Hydrocarbon Processing, the December issue, 1998, pp. 51-52.

Yuta Oda, "Basic knowledge on aircraft fluels", Koku Gijutsu No. 501, 1996, pp. 17-23:accompanied by English translation.

International Preliminary Report on Patentability for PCT/JP2010/064700, mailed Mar. 22, 2012; and English translation thereof.

International Search report for PCT/JP2010/064700, Mailed: Oct. 12, 2010.

Office Action for Japanese Patent Application No. 2009-200918, mailed on May 14, 2013.

Hitoshi Fujiwara, "Consumption of Fuel in Aircraft and Trend in Alternative Fuel," Petrotech, vol. 32, No. 7 (2009), printed on Jun. 20, 2009 and Published on Jul. 1, 2009, pp. 481-486; and a partial translation thereof.

Zhao et al., "Synthesis of ZSM-48 zeolites and their catalytic performance in C4-olefin cracking reactions", Applied Catalysis A: General 299, 2006, pp. 167-174.

International Preliminary Report on Patentability and Written Opinion for International Application No. PCT/JP2010/064723, mail date is Mar. 13, 2012.

U.S. Office Action in respect to U.S. Appl. No. 13/391,891, dated Sep. 6, 2013.

"Japanese Industrial Standard Aviation turbine fuels, JIS K 2209", Japanese Standards Association, Sep. 1, 1991.

"Criterion Mild Hydrocracking", Criterion Catalysts & Technologies, Criterion 424, 2005.

U.S. Appl. No. 13/391,765 Office Action, mail date is Oct. 7, 2013.

Zhao Yang et al., "Advance in hydroprocessing technology of manufacturing diesel with high cetane number from vegetable oil", Chemical Industry and Engineering Progress, vol. 26, No. 10, Dec. 28, 2007, pp. 1391-1394; with English Abstract.

China Office action for CN Patent Application No. 201080038694.8, mail date is Oct. 8, 2013.

Office Action for Taiwanese Patent Application No. 099129313 dated Jul. 25, 2014.

Chinese Office Action of application No. 201080038688.2, mail date is Dec. 1, 2014.

U.S. App. No. 13/391,765 to Yasutoshi Iguchi et al., filed Feb. 22, 2012.

U.S. Appl. No. 13/391,891 to Akira Koyama, filed Feb. 23, 2012.

Fujiwara, "Improvement of atmospheric environments around airports", Petrotech, Jun. 2009, pp. 481-486.

"The Path to a Jet Fuel Alternative: Airbus Initiatives and the Steps Ahead", ICAO Journal, 2008, pp. 22-24.

Abe, "Operation of flight demonstration using biofuel", Aviation Engineering, Jun. 1, 2009, pp. 24-28.

Search report from International Application No. PCT/JP2010/064724, mail date is Sep. 21, 2010.

Search report from International Preliminary Report and Written Opinion on International Application No. PCT/JP2010/064724, mail date is Apr. 5, 2012.

\* cited by examiner

METHOD FOR PRODUCING AVIATION FUEL OIL BASE AND AVIATION FUEL OIL COMPOSITION

TECHNICAL FIELD

The present invention relates to a method for producing an aviation fuel oil base and an aviation fuel oil composition.

BACKGROUND ART

As a countermeasure to prevent global warming, attention is being given to effective utilization of biomass's own energy. Among others, plant-derived biomass energy can effectively utilize carbon fixed from carbon dioxide in the atmosphere by photosynthesis in the course of growth of plants and therefore has the property of so-called carbon neutral, which does not lead to increase of carbon dioxide in the atmosphere, from the viewpoint of life cycle. Moreover, also from the viewpoint of depletion of petroleum resources, rise in crude oil price, etc., biomass fuel is viewed as a promising alternative energy to oil.

In the field of transportation fuel as well, using such biomass energy has been studied. For example, if using animal or vegetable oil-derived fuel as diesel fuel becomes possible, it is expected to play an effective role in reduction of emission of carbon dioxide by virtue of the synergistic effect with high energy efficiency of diesel engine.

Fatty acid methyl ester oil (abbreviated to "FAME" from the initials of Fatty Acid Methyl Ester) is known as animal or vegetable oil used in diesel fuel. FAME is produced by subjecting triglyceride, which is a general structure of animal or vegetable oil, to transesterification reaction with methanol by the action of an alkali catalyst or the like. This FAME has been studied for its use not only in diesel fuel but also in aviation fuel oil, so-called jet fuel. Aircraft are greatly influenced by rise in crude oil price of recent years, because their fuel use is enormous. In such a situation, biomass fuel has received attention not only as prevention of global warming but also as a promising candidate of alternative fuel to oil. Under such circumstances, mixed use of FAME to petroleum-based jet fuel has been practiced currently on a trial basis in several airline companies.

However, the process of producing FAME requires processing of secondarily produced glycerin, as described in the Patent Literature given below. Moreover, problems such as cost or energy required for washing of produced oil, etc., have been pointed out.

CITATION LIST

Patent Literature

Patent Literature 1: Japanese Patent Application Laid-Open No. 2005-154647

SUMMARY OF INVENTION

Technical Problem

Aviation fuel oils are exposed to extremely low temperatures during flight at high altitude, and thus strict low-temperature performance standards are provided. However, since FAMEs do not have sufficient low-temperature performance or oxidation stability, when a FAME is blended in an aviation fuel oil, the low-temperature performance and oxidation stability may deteriorate. Consequently, when blending a FAME in an aviation fuel oil, it is necessary to mix a petroleum-derived base in the aviation fuel oil along with the FAME, and the FAME mixing proportion also cannot be very high. In this context, although the addition of an antioxidant is legislated as a specification of aviation fuel oil, the mixing ratio of the base has no other choice to be limited to low concentrations, as with low-temperature performance, in consideration of the stability of the base itself.

In contrast to this, a production technique of using animal or vegetable oils and fats as raw materials and reacting these at a high temperature and a high pressure in the presence of molecular hydrogen and a catalyst to obtain hydrocarbon has received attention. Since hydrocarbon obtained by this approach, unlike FAME, contains neither oxygen nor unsaturated bond and has properties equivalent to petroleum-based hydrocarbon fuel, it is considered that use at a higher concentration than FAME becomes possible, for example, as aviation fuel.

The present invention was created in view of the above-described circumstances. It is an object of the present invention to provide a method for producing an aviation fuel oil base capable of producing at a high yield an aviation fuel oil base having excellent low-temperature properties while also having excellent life cycle characteristics by including a component derived from an animal or vegetable oil and fat. Further, it is an object of the present invention to provide an aviation fuel oil composition having excellent life cycle characteristics and low-temperature performance.

Solution to Problem

To achieve the above-described objects, the present invention provides a method for producing an aviation fuel oil base, comprising a first step of obtaining a first generated oil by hydrotreating a feedstock which contains an oxygen-containing hydrocarbon compound derived from an animal or vegetable oil and fat by bringing the feedstock into contact with a first dual functional catalyst which has dehydrogenation and hydrogenation functions and which comprises a metal of group 6B of the periodic table, a metal of group 8, and an amorphous solid acidic substance, in the presence of hydrogen, and a second step of obtaining a second generated oil comprising an aviation fuel oil base by hydroisomerizing the first generated oil by bringing the first generated oil into contact with a second dual functional catalyst which has dehydrogenation and hydrogenation functions and which comprises a metal of group 8 of the periodic table and a crystalline solid acidic substance, in the presence of hydrogen.

In the production method according to the present invention, it is preferred that the feedstock should contain 1 to 100 mass ppm in terms of sulfur atoms of a sulfur-containing hydrocarbon compound.

In the production method according to the present invention, it is preferred that the metal of group 6B of the periodic table in the first dual functional catalyst should be molybdenum and/or tungsten, and the metal of group 8 of the periodic table in the first dual functional catalyst is cobalt and/or nickel, and that the method comprises a presulfiding step of sulfiding the first dual functional catalyst, before the first step.

In the production method according to the present invention, it is preferred that the crystalline solid acidic substance in the second dual functional catalyst should be a crystalline substance comprising at least one crystal selected from the group consisting of a one-dimensional, 10-member ring aluminosilicate having an MEL structure, a TON structure, an MTT structure, and an MRE structure, and a silicoaluminophosphate having an AEL structure.

In the production method according to the present invention, it is preferred that the second dual functional catalyst should comprise a one-dimensional, 10-member ring aluminosilicate and/or a silicoaluminophosphate, and a total content of the one-dimensional, 10-member ring aluminosilicate and the silicoaluminophosphate is 65 to 85 mass %.

In the production method according to the present invention, it is preferred that the one-dimensional, 10-member ring aluminosilicate should comprise at least one selected from the group consisting of ZSM-11, ZSM-22, ZSM-23, and ZSM-48, and that the silicoaluminophosphate comprises at least one selected from the group consisting of SAPO-11 and SAPO-34.

In the production method according to the present invention, it is preferred that a hydroisomerization ratio should exceed 90 mass %.

The present invention further provides an aviation fuel oil composition, containing a first aviation fuel oil base obtained by the above-described methods for producing an aviation fuel oil base and a second aviation fuel oil base produced from a petroleum-based feedstock, wherein a content of the first aviation fuel oil base is 5 to 50 mass % and a content of the second aviation fuel oil base is 50 to 95 mass %.

Advantageous Effects of Invention

According to the present invention, it is possible to provide a method for producing an aviation fuel oil base capable of producing at a high yield an aviation fuel oil base having excellent low-temperature properties while also having excellent life cycle characteristics by including a component derived from an animal or vegetable oil and fat. Further, it is possible to provide an aviation fuel oil composition having excellent life cycle characteristics and low-temperature performance.

DESCRIPTION OF EMBODIMENTS

A preferred embodiment of the present invention will now be described. The method for producing the aviation fuel oil base according to the present embodiment has a first step of obtaining a first generated oil by hydrotreating a feedstock which contains an oxygen-containing hydrocarbon compound included in an animal or vegetable oil and fat by bringing the feedstock into contact with a first dual functional catalyst which has dehydrogenation and hydrogenation functions and which comprises a metal of group 6B of the periodic table, a metal of group 8, and an amorphous solid acidic substance, in the presence of hydrogen, and a second step of obtaining a second generated oil by hydroisomerizing the first generated oil by bringing the first generated oil into contact with a second dual functional catalyst which has dehydrogenation and hydrogenation functions and which comprises a metal of group 8 of the periodic table and a crystalline solid acidic substance, in the presence of hydrogen. Below, the details of each of these steps will be described.

In the first step, a feedstock including an oxygen-containing hydrocarbon compound derived from an animal or vegetable oil and fat is used. Examples of the animal and vegetable oils and fats include tallow, rapeseed oil, camelina oil, soybean oil, palm oil, and oils and fats or hydrocarbons produced by a specific algae. "Specific algae" as referred to here means an algae having a property for converting a part of a nutrient content in a body into a hydrocarbon or an oil and fat. Specific examples of the specific algae include *chlorella*, *Scenedesmus*, *Spirulina*, *Euglena*, *Botryococcus braunii*, and *Pseudochoricystis ellipsoidea*. Of these, *chlorella*, *Scenedesmus*, *Spirulina*, and *Euglena* produce oils and fats, and *Botryococcus braunii* and *Pseudochoricystis ellipsoidea* produce hydrocarbons.

In the present embodiment, one may use any oil and fat as the animal or vegetable oil and fat or may use waste oil obtained after using these fats and oils. From the viewpoint of carbon neutral, it is preferred that the animal or vegetable oil and fat should contain plant-derived oils and fats, and from the viewpoint of jet fraction yields after hydrotreatment, one having a high constitutive ratio of each fatty acid group (fatty acid composition) in which the number of carbon in the carbon chain of fatty acid is 10 to 14 is preferable: thus, coconut oil and palm kernel oil and camelina oil are preferable as plant oil and fat possible from this viewpoint, and oils and fats which Euglena produces are preferable as oils and fats which a particular microalga produces. Further, the above-described animal and vegetable oils and fats may be used as a single kind or as a combination of two kinds or more.

In this context, the fatty acid composition is a value determined according to Standard Test Method of Analysis of Oils and Fats (set by Japan Oil Chemists' Society) (1993) "2.4.21.3-77 Fatty Acid Composition (FID Programmed Temperature Gas Chromatograph Method)" using a programmed temperature gas chromatograph equipped with a flame ionization detector (FID) from methyl ester prepared according to Standard Test Method of Analysis of Oils and Fats (set by Japan Oil Chemists' Society) (1991) "2.4.20.2-91 Method for Preparing Fatty Acid Methyl Ester (Boron Trifluoride-Methanol Method)", and refers to a constitutive ratio (mass %) of each fatty acid group constituting the oil and fat.

The feedstock preferably includes a sulfur-containing hydrocarbon compound. The sulfur-containing hydrocarbon compound contained in the raw material oil is not particularly limited, and examples thereof specifically include sulfide, disulfide, polysulfide, thiol, thiophene, benzothiophene, dibenzothiophene, and their derivatives, and the like. The sulfur-containing hydrocarbon compound contained in the raw material oil may be a single compound or may be a mixture of two kinds or more. Furthermore, one may use a petroleum-derived hydrocarbon fraction containing a sulfur content as the sulfur-containing hydrocarbon compound.

The sulfur content included in the feedstock is preferably, based on the feedstock total amount, in terms of sulfur atoms 1 to 100 mass ppm, more preferably 5 to 50 mass ppm, and even more preferably 10 to 20 mass ppm. If the content of the sulfur content in terms of sulfur atoms is less than 1 mass ppm, it tends to be difficult to stably maintain deoxidation activity, which is the main reaction in the first step. On the other hand, if the sulfur content in terms of sulfur atoms is more than 50 mass ppm, the sulfur concentration in the light gas discharged in the first step increases, and the catalytic activity of the second step may deteriorate. Further, the sulfur content included in the second generated oil obtained in the second step tends to increase, so that there may be an adverse impact on the environment during combustion. In this context, the sulfur content in the present specification is a mass content of a sulfur content measured according to JIS K 2541 "Determination of sulfur content" or a method described in ASTM-5453.

The sulfur-containing hydrocarbon compound may be introduced into the reactor of the first step as a mixture obtained by mixing in advance with an oxygen-containing hydrocarbon compound derived from animal or vegetable oil and fat, or may be supplied upstream from the reactor of the first step in introducing the oxygen-containing hydrocarbon compound derived from animal or vegetable oil and fat into the reactor of the first step.

In addition to an oxygen-containing hydrocarbon compound derived from an animal or vegetable oil and fat and a sulfur-containing hydrocarbon compound, the feedstock may also include a petroleum-based base obtained by refining crude oil and the like. The petroleum-based base obtained by refining crude oil and the like may be a fraction obtained by atmospheric distillation or vacuum distillation of crude oil, or a fraction obtained by a reaction such as hydrodesulfurization, hydrocracking, fluid catalytic cracking, and catalytic reforming. The content of the petroleum-based base in the feedstock is preferably adjusted so that the sulfur content included in the feedstock satisfies the above-described concentration range. Specifically, the content of the petroleum-based base in the feedstock is preferably 20 to 70 vol %, and more preferably 30 to 60 vol %. The above-described petroleum-based base may be used as a single kind or as a combination of two kinds or more. Further, the petroleum-based base may be a compound derived from a chemical product or a synthetic oil obtained via a Fischer-Tropsch reaction.

The first step comprises the following hydrotreatment step. It is preferred that the hydrotreatment step according to the present embodiment should be performed under conditions in which a hydrogen pressure is 1 to 13 MPa, a liquid hourly space velocity is 0.1 to 3.0 $h^{-1}$, and a hydrogen/oil ratio is 150 to 1500 NL/L; conditions in which a hydrogen pressure is 2 to 11 MPa, a liquid hourly space velocity is 0.2 to 2.0 $h^{-1}$, and a hydrogen/oil ratio is 200 to 1200 NL/L are more preferable; and conditions in which a hydrogen pressure is 3 to 10.5 MPa, a liquid hourly space velocity is 0.25 to 1.5 $h^{-1}$, and a hydrogen/oil ratio is 300 to 1000 NL/L are further more preferable.

Any of these conditions are factors that determine reaction activity, and, for example, there is a fear of causing reduction in reactivity or rapid reduction in activity when the hydrogen pressure and the hydrogen/oil ratio do not satisfy the lower limits, while there is a fear of requiring excessive equipment investment for a compressor or the like when the hydrogen pressure and the hydrogen/oil ratio exceed the upper limits. The lower the liquid hourly space velocity becomes, the more advantageous it tends to become to the reaction; and however, there is tendency to require an exceedingly large reaction tower volume and require excessive equipment investment when the liquid hourly space velocity is lower than the lower limit, whereas there is a tendency that the reaction does not sufficiently proceed when the liquid hourly space velocity exceeds the upper limit.

The reaction temperature can be set arbitrarily for decomposing the heavy fraction of the raw material oil at a decomposition rate of interest or obtaining each fraction at fraction yields of interest. The average temperature of the whole reactor is usually in the range of 150 to 480° C., preferably 200 to 400° C., more preferably 260 to 360° C. There is a fear that the reaction does not sufficiently proceed when the reaction temperature is lower than 150° C., while there is a tendency that decomposition exceedingly proceeds to cause reduction in liquid product yields when the reaction temperature exceeds 480° C.

One can use, as the first dual functional catalyst used in the first step, a catalyst supporting a metal selected from elements of group 6B and Group 8 of the Periodic Table by a support comprising a porous inorganic oxide constituted to contain two kinds or more of elements selected from aluminum, silicon, zirconium, boron, titanium, and magnesium.

An amorphous solid acidic substance is used as the support in the first dual functional catalyst, and for example, a porous inorganic oxide containing two kinds or more of elements selected from aluminum, silicon, zirconium, boron, titanium, and magnesium is used. One that is usual is a porous inorganic oxide containing alumina, and examples of other constituents of the support include silica, zirconia, boria, titania, magnesia, and the like. One that is preferred is a composite oxide containing alumina with at least one kind or more selected from the other constituents. Moreover, the porous inorganic oxide may contain phosphorus as an additional component. The total content of the components other than alumina in the support of the first dual functional catalyst is preferably 1 to 20 mass %, and more preferably 2 to 15 mass %. If the total content of the components other than alumina is less than 1 mass %, it is difficult to obtain a sufficient catalyst surface area, and the activity tends to decrease. On the other hand, if the total content of the components other than alumina is more than 20 mass %, the acidic nature of the support tends to increase, and activity deterioration due to coke generation tends to occur. When the support contains phosphorus as a constituent, it is preferred that the phosphorus content with respect to the whole support should be 1 to 5 mass % in terms of the oxide, and it is more preferred that this phosphorus content should be 2 to 4 mass % in terms thereof.

Raw materials that serve as precursors of silica, zirconia, boria, titania, and magnesia as constituents of the support except alumina are not particularly limited, and one can use a general solution containing silicon, zirconium, boron, titanium, or magnesium. For example, one can use silicic acid, water glass, silica sol, or the like as to silicon, titanium sulfate, titanium tetrachloride or various kinds of alkoxide salts, or the like as to titanium, zirconium sulfate, various kinds of alkoxide salts, or the like as to zirconium, and boric acid or the like as to boron. One can use magnesium nitrate or the like as to magnesium. One can use phosphoric acid or an alkali metal salt of phosphoric acid, or the like as phosphorus.

A method of adding the raw materials for the constituents of the support except alumina in any step prior to calcining of the support is preferable. For example, one may perform the addition to an aqueous aluminum solution in advance and then prepare an aluminum hydroxide gel containing these constituents, may perform the addition to a formulated aluminum hydroxide gel, or may perform the addition in the step of adding water or an acidic aqueous solution to a commercially available alumina intermediate or boehmite powder, followed by kneading; and however, a method of allowing them to coexist at the stage of formulating an aluminum hydroxide gel is more preferable. The effect development mechanism of these constituents of the support except alumina has not yet been elucidated, and they seem to form a composite oxide state with aluminum. It is considered that by this, the surface area of the support increases and causes some interaction with active metal, thereby influencing the activity of the catalyst.

The first dual functional catalyst includes, as active metals, at least one metal element selected from the metals of group 6B of the periodic table and at least one metal element selected from the metals of group 8. More specifically, the first dual functional catalyst includes, as active metals, two kinds of metal or more, which are selected from the metals of group 6B of the periodic table and the metals of group 8 of the periodic table. Examples of the active metals include Co—Mo, Ni—Mo, Ni—Co—Mo, and Ni—W. During the hydrotreatment, these metals are converted into a sulfide state and used. By carrying out a presulfiding step before the first step, these metals can be converted into a sulfide.

For example, if including W and/or Mo as active metals, the total content (supported content) of the catalyst mass standard of W and Mo in the first dual functional catalyst is, in terms of oxide, preferably 12 to 35 mass %, and more preferably 15 to 30 mass %. If the above-described total content of W and Mo is less than 12 mass %, activity tends to deteriorate due to a decrease in the number of active sites. If the above-described total content of W and Mo is more than 35 mass %, the active metals tend not to effectively disperse, and activity tends to deteriorate.

Further, for example, if the active metals include Co and/or Ni, the total content (supported content) of the catalyst mass standard of Co and Ni in the first dual functional catalyst is, in terms of oxide, preferably 1.5 to 10 mass %, and more preferably 2 to 8 mass %. If the above-described total content of Co and Ni is less than 1.5 mass %, a sufficient promoter effect cannot be obtained and activity tends to deteriorate. If the above-described total content of Co and Ni is more than 10 mass %, the active metals tend not to effectively disperse, and activity tends to deteriorate.

A method for allowing the active metal to be supported by the support in preparing the first dual functional catalyst is not particularly limited, and one can use a method known in the art applied in producing a usual desulfurization catalyst. Usually, a method of impregnating the catalyst support with a solution containing a salt of the active metal is preferably adopted. Moreover, equilibrium adsorption method, Pore-filling method, Incipient-wetness method, or the like is also preferably adopted. For example, the Pore-filling method is a method of measuring the pore volume of the support in advance and performing impregnation with a metal salt solution having the same volume thereas, wherein the impregnation method is not particularly limited and one can perform the impregnation by an appropriate method according to the amount of the metal supported or the physical properties of the catalyst support.

The reactor format in the hydrotreatment reaction in the first step may be a fixed-bed style. Specifically, molecular hydrogen can adopt any format of a counter flow or a parallel flow relative to the raw material oil, and moreover, one that is also preferred is a format that has a plurality of reaction towers and combines a counter flow and a parallel flow. A general format is a down flow and can adopt a gas-liquid parallel two-phase flow format. Moreover, one may use the reactors alone or in combination of some of them and may adopt a structure in which the inside of one reactor is partitioned into a plurality of catalyst beds.

In the first step of the present embodiment, the hydrotreated oil subjected to hydrotreatment in the reactor is fractionated through a gas-liquid separation step, a rectification step, and so on, into the predetermined fractions. Here, for removing water formed during the reaction and by-product gas such as carbon monoxide, carbon dioxide, and hydrogen sulfide, one may place gas-liquid separation equipment or other by-product gas removal apparatuses between a plurality of reactors or in a product recovery step. Examples of the apparatus removing by-products can preferably include high-pressure separators and the like.

Hydrogen gas as molecular hydrogen is introduced from the entrance of the first reactor so as to accompany the raw material oil before or after the raw material passes through a raw material-heating furnace, and aside from this, the introduction may be performed between the catalyst beds or between a plurality of reactors for the purpose of controlling a temperature in the reactor and maintaining hydrogen pressure as throughout the inside of the reactor as possible. Hydrogen thus introduced is referred to as quenching hydrogen. Here, the ratio of the quenching hydrogen to the hydrogen introduced to accompany the raw material oil is preferably 10 to 60 vol %, more preferably 15 to 50 vol %. There is a fear that reaction at a downstream reaction site does not sufficiently proceed when the ratio of the quenching hydrogen is lower than 10 vol %, while there is a fear that reaction in the neighborhood of the reactor entrance does not sufficiently proceed when the ratio of the quenching hydrogen exceeds 60 vol %.

In the method for producing an aviation fuel oil base of the present embodiment, one can allow the raw material oil to contain a particular amount of recycled oil, for suppressing a heating value in the reactor for hydrotreatment in performing the hydrotreatment of the raw material oil. It is preferred that the content of the recycled oil in the raw material oil should be set to 0.5 to 5 times with respect to the mass of the oxygen-containing hydrocarbon compound derived from animal or vegetable oil and fat, and one can appropriately adjust the ratio within the range according to the highest operating temperature of the reactor for hydrotreatment. This is due to the reason that on the assumption that the specific heats of both the oils are the same, the recycled oil within the range can sufficiently reduce heat of reaction because temperature rise when they are mixed at a 1:1 ratio is half the case in which a substance derived from animal or vegetable oil and fat is reacted alone. In this context, if the content of the recycled oil is larger than 5 times the mass of the oxygen-containing hydrocarbon compound, there is a tendency that: reactivity decreases because the concentration of the oxygen-containing hydrocarbon compound decreases; and load increases because the flow rate of piping or the like increases. On the other hand, if the content of the recycled oil is smaller than 0.5 times the mass of the oxygen-containing hydrocarbon compound, there is a tendency that it cannot sufficiently suppress temperature rise.

A method for mixing the raw material oil and the recycled oil is not particularly limited, and for example, one may mix them in advance and introduce the mixture into the reactor in the hydrotreatment apparatus or may supply the recycled oil upstream of the reactor in introducing the raw material oil into the reactor. Furthermore, one may also connect a plurality of reactors in series and perform introduction between the reactors or may also divide a catalyst layer in a single reactor and perform introduction between the catalyst layers.

It is preferred that the recycled oil should contain a portion of hydrotreated oil (first produced oil) obtained by performing the hydrotreatment of the raw material oil and then removing secondarily produced water, carbon monoxide, carbon dioxide, hydrogen sulfide, or the like. Furthermore, it is preferred that it should contain a portion of an isomerization product of each of a light fraction, an intermediate fraction, and a heavy fraction fractionated from the hydrotreated oil, or a portion of an intermediate fraction fractionated from a further isomerization product of the hydrotreated oil.

The method for producing the aviation fuel oil base of the present embodiment has a second step of further hydroisomerizing the first generated oil obtained by the hydrotreatment step, which is the above-described first step.

The sulfur content included in the first generated oil, which is the feedstock of the hydroisomerizing reaction of the second step, is preferably 10 mass ppm or less, and more preferably 5 mass ppm or less. If the sulfur content is more than 10 mass ppm, progress of the hydroisomerization reaction can be hindered due to the active metals of the second dual functional catalyst used in the second step being poisoned from the sulfur. In addition, for a similar reason, it is preferred that the sulfur concentration in the reaction gas including hydrogen to be introduced along with the hydrotreated oil should be sufficiently low. Specifically, the sulfur concentration in the reaction gas is preferably 10 volume ppm or less, and more preferably 5 volume ppm or less.

It is preferred that the second step should be performed in the presence of hydrogen under conditions in which a hydrogen pressure is 2 to 13 MPa, a liquid hourly space velocity is 0.1 to 3.0 h$^{-1}$, and a hydrogen/oil ratio is 250 to 1500 NL/L; it is more preferred that the second step should be performed under conditions in which a hydrogen pressure is 2.5 to 10 MPa, a liquid hourly space velocity is 0.5 to 2.0 h$^{-1}$, and a hydrogen/oil ratio is 380 to 1200 NL/L; and it is further preferred that the second step should be performed under conditions in which a hydrogen pressure is 3 to 8 MPa, a liquid hourly space velocity is 0.8 to 2.5 h$^{-1}$, and a hydrogen/oil ratio is 350 to 1000 NL/L.

Any of these conditions are factors that determine reaction activity, and, for example, there is a fear of causing rapid reduction in activity or reduction in reactivity when the hydrogen pressure and the hydrogen/oil ratio do not satisfy the lower limits, while there is a fear of requiring excessive equipment investment for a compressor or the like when the hydrogen pressure and the hydrogen/oil ratio exceed the upper limits. The lower the liquid hourly space velocity becomes, the more advantageous it tends to become to the reaction; and however, there is tendency to require an exceedingly large reaction tower volume and require excessive equipment investment when the liquid hourly space velocity is lower than the lower limit, whereas there is a tendency that the reaction does not sufficiently proceed when the liquid hourly space velocity exceeds the upper limit.

The reaction temperature in the second step can be set arbitrarily for obtaining a decomposition rate of interest of the heavy fraction of the raw material oil or fraction yields of interest. For example, it is preferred that the reaction temperature should be 150 to 380° C.; it is more preferred that the reaction temperature should be 240 to 380° C.; and it is further preferred that the reaction temperature should be 250 to 365° C. There is a fear that sufficient hydroisomerization reaction does not proceed when the reaction temperature is lower than 150° C., while there is a fear that excessive decomposition or other side reactions proceed to cause reduction in liquid product yields when the reaction temperature is higher than 380° C.

Used as the second dual functional catalyst used in the second step is a catalyst formed by supporting one or more metals selected from the elements of group 8 of the periodic table on a support formed from a one-dimensional, 10-member ring aluminosilicate and/or a one-dimensional, 10-member ring silicoaluminophosphate, with a porous inorganic oxide formed from a substance selected from aluminum, silicon, zirconium, boron, titanium, and magnesium as a binder.

The second dual functional catalyst includes a crystalline solid acidic substance as a support. Examples of the crystalline solid acidic substance include a porous inorganic oxide. Specific examples include alumina, titania, zirconia, boria, and silica. In the present embodiment, among these, a binder formed from at least one of titania, zirconia, boria, and silica, and alumina is preferred.

A method for producing the second dual functional catalyst is not particularly limited, and one can adopt an arbitrary preparation method using raw materials in a state such as various kinds of sols or salt compounds corresponding to each element. Furthermore, one may perform the preparation by temporarily preparing a composite hydroxide or a composite oxide such as silica-alumina, silica-zirconia, alumina-titania, silica-titania, or alumina-boria and then adding it as an alumina gel or in an additional hydroxide state or an appropriate solution state in an arbitral step of the preparation steps. The ratios of alumina and the additional oxide can take arbitrary ratios to the support: with respect to the total of alumina and the additional oxide, the ratio of alumina is preferably 90 mass % or less, more preferably 60 mass % or less, further preferably 40 mass % or less and is preferably 10 mass % or more, more preferably 20 mass % or more.

The crystalline solid acidic substance preferably includes a one-dimensional, 10-member ring aluminosilicate and/or a one-dimensional, 10-member ring silicoaluminophosphate. The one-dimensional, 10-member ring aluminosilicate is preferably a zeolite having a TON, an MTT, and an MRE structure. The one-dimensional, 10-member ring silicoaluminophosphate is a crystalline substance having an AEL structure. These may be used as a single kind or as a combination of two kinds or more.

One kind or more of metals selected from elements of Group 8 of the Periodic Table are used as the active metal in the second dual functional catalyst. Among these metals, it is preferred to use one kind or more of metals selected from the group consisting of Pd, Pt, Rh, Ir, Au, and Ni, and it is more preferred to use in combination two kinds or more of metals selected from this group. Examples of the suitable combination include Pd—Pt, Pd—Ir, Pd—Rh, Pd—Au, Pd—Ni, Pt—Rh, Pt—Ir, Pt—Au, Pt—Ni, Rh—Ir, Rh—Au, Rh—Ni, Ir—Au, Ir—Ni, Au—Ni, Pd—Pt—Rh, Pd—Pt—Ir, Pt—Pd—Ni, and the like. Of them, the combination of Pd—Pt, Pd—Ni, Pt—Ni, Pd—Ir, Pt—Rh, Pt—Ir, Rh—Ir, Pd—Pt—Rh, Pd—Pt—Ni, or Pd—Pt—Ir is more preferable, and the combination of Pd—Pt, Pd—Ni, Pt—Ni, Pd—Ir, Pt—Ir, Pd—Pt—Ni, or Pd—Pt—Ir is further preferable.

The total content (total supported amount) of the active metals based on the catalyst mass is preferably 0.05 to 2 mass % in terms of the metals, 0.1 to 1.5 mass % is more preferred, and 0.15 to 1.2 mass % is even more preferred. If the total content of the active metals used as a reference for the catalyst mass is less than 0.05 mass %, the number of active sites tends to decrease, and a sufficient activity tends not to be obtained. On the other hand, if the total content is more than 1.2 mass %, the metals tend not to effectively disperse, and cracking activity tends to increase.

A method for allowing the active metal to be supported by the support in preparing the second dual functional catalyst is not particularly limited, and one can use a method known in the art applied in producing a usual desulfurization catalyst. Usually, a method of impregnating the catalyst support with a solution containing a salt of the active metal is preferably adopted. Moreover, equilibrium adsorption method, Pore-filling method, Incipient-wetness method, or the like is also preferably adopted. For example, the Pore-filling method is a method of measuring the pore volume of the support in advance and performing impregnation with a metal salt solution having the same volume thereas, wherein the impregnation method is not particularly limited and one can perform the impregnation by an appropriate method according to the amount of the metal supported or the physical properties of the catalyst support.

The second dual functional catalyst preferably has had the active metals included in the catalyst subjected to a reduction treatment before being subjected to the hydroisomerization reaction in the second step. The reduction conditions are not especially limited. For example, reduction can be carried out by treating under a hydrogen flow at 200 to 400° C., and preferably at 240 to 380° C. If the reduction temperature is less than 200° C., the reduction of the active metals may not sufficiently proceed, and the hydrotreatment and the hydroisomerizing activity may not be exhibited. Further, if the reduction temperature is more than 400° C., agglomeration of the active metals may proceed, and activity may similarly not be exhibited.

The reactor format in the second step may be a fixed-bed style. Specifically, hydrogen can adopt any format of a counter flow or a parallel flow relative to the raw material oil (first produced oil), and moreover, one that is also preferred is a format that has a plurality of reaction towers and combines a counter flow and a parallel flow. A general format is a down flow and can adopt a gas-liquid parallel two-phase flow format. Moreover, one may use the reactors alone or in combination of some of them and may adopt a structure in which the inside of one reactor is partitioned into a plurality of catalyst beds.

In the second step, hydrogen gas can be introduced from an inlet port of the initial reactor so as to accompany the first generated oil before the first generated oil passes through the heating furnace or after the first generated oil has passed through the heating furnace. Further, separately to this, along with controlling the temperature in the reactor, hydrogen gas may be introduced between catalyst beds or between a plurality of reactors in order to maintain the hydrogen pressure across all the reactors as much as possible. Hydrogen gas thus introduced is referred to as quenching hydrogen. Here, the ratio of the quenching hydrogen to the hydrogen introduced to accompany the first produced oil is preferably 10 to 60 vol %, more preferably 15 to 50 vol %. There is a fear that reaction at a downstream reaction site does not sufficiently proceed when the ratio of the quenching hydrogen is lower than 10 vol %, while there is a fear that reaction in the neighborhood of the reactor entrance does not sufficiently proceed when the ratio of the quenching hydrogen exceeds 60 vol %.

A second produced oil obtained by performing the hydroisomerization treatment in the second step may be fractionated, if necessary, into a plurality of fractions in a rectification tower. For example, one may perform the fractionation into light fractions such as gas and naphtha fractions, intermediate fractions such as kerosene and gas oil fractions, and heavy fractions such as residues. In this case, it is preferred that the cut temperature between the light fraction and the intermediate fraction should be 100 to 200° C.; it is more preferred that this cut temperature should be 120 to 180° C.; it is further preferred that this cut temperature should be 120 to 160° C.; and it is particularly preferred that this cut temperature should be 130 to 150° C. It is preferred that the cut temperature between the intermediate fraction and the heavy fraction should be 250 to 360° C.; it is more preferred that this cut temperature should be 250 to 320° C.; it is further preferred that this cut temperature should be 250 to 300° C.; and it is particularly preferred that this cut temperature should be 250 to 280° C. One can produce hydrogen by reforming, in a steam reforming apparatus, a portion of the light fraction produced by fractionation. Hydrogen thus produced has the feature of carbon neutral and can reduce load to the environment, because the raw material used in steam reforming is biomass-derived hydrocarbon. In this context, the intermediate fraction obtained by fractionating the second produced oil can be used particularly preferably as an aviation fuel oil base.

The aviation fuel oil base obtained by the above steps (hereinafter, referred to as "first aviation fuel oil base") may be used as an aviation fuel oil by itself, or mixed with an aviation fuel oil base obtained by refining crude oil and the like (hereinafter, "second aviation fuel oil base") to produce the aviation fuel oil composition of the present invention. Examples of the second aviation fuel oil base include an aviation fuel oil fraction obtained in a general petroleum refining step, a synthetic fuel oil base obtained via Fischer-Tropsch reaction or the like with synthetic gas composed of hydrogen and carbon monoxide as a raw material, and the like. This synthetic fuel oil base hardly contains an aromatic fraction, is composed mainly of saturated hydrocarbon, and has the feature of a high smoke point. In this context, one can use a method known in the art as a method for producing the synthetic gas, which is not particularly limited.

According to the method for producing the aviation fuel oil base of the present invention, having an excellent low-temperature performance due to improving the degree of isomerization can be combined with the excellent life cycle characteristics obtained from carbon neutral characteristics. Further, an aviation fuel oil base and an aviation fuel oil having a low environmental burden that will contribute to primary energy diversification can be provided.

Next, a preferred embodiment of the aviation fuel oil composition of the present invention will be described. The aviation fuel oil composition of the present embodiment preferably includes 5 to 50 mass %, more preferably 5 to 40 mass %, and even more preferably 8 to 30 mass % of the first aviation fuel oil base. On the other hand, the aviation fuel oil composition preferably includes 50 to 95 mass %, more preferably 60 to 95 mass %, and even more preferably 70 to 92 mass % of the second aviation fuel oil base.

To the aviation fuel oil composition of the present embodiment, one can add various kinds of additives conventionally added to aviation fuel oil. Examples of this additive include one or more additives selected from an antioxidant, an antistatic agent, a metal inactivating agent, and a anti-icing agent.

One can add N,N-diisopropyl-paraphenylenediamine, a mixture of 75% or more 2,6-di-tertiary butyl phenol with 25% or less tertiary and tri-tertiary butyl phenols, a mixture of 72% or more 2,4-dimethyl-6-tertiary butyl phenol with 28% or less monomethyl and dimethyl tertiary butyl phenols, a mixture of 55% or more 2,4-dimethyl-6-tertiary butyl phenol with 45% or less tertiary and di-tertiary butyl phenols, 2,6-di-tertiary butyl-4-methyl phenol, or the like, as the antioxidant within a range that does not exceed 24.0 mg/l for preventing formation of gas in the aviation fuel oil.

One can add STADIS450 manufactured by Octel, or the like, as the antistatic agent within a range that does not exceed 3.0 mg/l for preventing accumulation of static electricity formed by friction with the inner wall of piping when the aviation fuel oil flows within the fuel piping system at a high speed and enhancing electric conductivity.

One can add N,N-disalicylidene-1,2-propanediamine or the like as the metal inactivating agent within a range that does not exceed 5.7 mg/l for preventing fuel from becoming unstable by the reaction of free metal components contained in the aviation fuel oil.

One can add ethylene glycol monomethyl ether or the like as the anti-icing agent within the range of 0.1 to 0.15 vol % for preventing a trace amount of water contained in the aviation fuel oil from being frozen to clog piping.

The aviation fuel oil composition of the present embodiment can further be formulated with arbitrary additives such as an antistatic agent, an anticorrosive agent, and a bactericidal agent, as appropriate, without departing from the present invention.

The aviation fuel oil composition of the present embodiment satisfies the value of standard of HS K2209 "Aviation turbine fuels".

From the viewpoint of a fuel consumption rate, it is preferred that the density at 15° C. of the aviation fuel oil composition of the present embodiment should be 775 kg/m$^3$ or larger, and it is more preferred that this density should be 780 kg/m$^3$ or larger. On the other hand, from the viewpoint of flammability, it is preferred that this density should be 839 kg/m³ or smaller; it is more preferred that this density should be 830 kg/m³ or smaller; and it is further preferred that this density should be 820 kg/m³ or smaller. In this context, the density at 15° C. in the present specification means a value measured according to JIS K2249 "Crude Oil and Petroleum Products—Determination of density and petroleum measurement tables based on reference temperature (15° C.)", unless otherwise specified.

From the viewpoint of distillation properties, it is preferred that the distillation properties of the aviation fuel oil composition of the present embodiment should be 204° C. or lower in terms of the distillation temperature at 10 vol % evaporated, and it is more preferred that this temperature should be 200° C. or lower. From the viewpoint of combustion characteristics (burnout properties), it is preferred that the end point should be 300° C. or lower; it is more preferred that the end point should be 290° C. or lower; and it is further preferred that the end point should be 280° C. or lower. In this context, the distillation properties in the present specification mean a value measured according to JIS K2254 "Petroleum Products—Determination of distillation characteristics", unless otherwise specified.

From the viewpoint of prevention of malfunction attributed to deposit formation in the fuel introduction system or the like, it is preferred that the existent gum content of the aviation fuel oil composition of the present embodiment should be 7 mg/100 ml or lower; it is more preferred that this existent gum content should be 5 mg/100 ml or lower; and it is further preferred that this existent gum content should be 3 mg/100 ml or lower. In this context, the existent gum content in the present specification means a value measured according to JIS K2261 "Motor gasoline and aviation fuels—Determination of existent gum", unless otherwise specified.

From the viewpoint of a fuel consumption rate, it is preferred that the net heat of combustion of the aviation fuel oil composition of the present embodiment should be 42.8 MJ/kg or higher, and it is more preferred that this net heat of combustion should be 45 MJ/kg or higher. In this context, the net heat of combustion in the present specification means a value measured according to JIS K2279 "Crude Oil and petroleum products—Determination of heat of combustion", unless otherwise specified.

From the viewpoint of flowability in fuel piping or achievement of uniform fuel jet, it is preferred that the kinematic viscosity at –20° C. of the aviation fuel oil composition of the present embodiment should be 8 mm²/s or lower; it is more preferred that this kinematic viscosity should be 7 mm²/s or lower; and it is further preferred that this kinematic viscosity should be 5 mm²/s or lower. In this context, the kinematic viscosity in the present specification means a value measured according to JIS K2283 "Crude petroleum and petroleum products—Determination of kinematic viscosity", unless otherwise specified.

From the viewpoint of the corrosiveness of fuel tanks or piping, it is preferred that the copper corrosion of the aviation fuel oil composition of the present embodiment should be 1 or lower. The copper corrosion in the present specification means a value measured according to JIS K2513 "Petroleum Products—Corrosiveness to copper-Copper strip test", unless otherwise specified.

From the viewpoint of flammability (prevention of smoke dust), it is preferred that the aromatic content of the aviation fuel oil composition of the present embodiment should be 25 vol % or lower, and it is more preferred that this aromatic content should be 20 vol % or lower. The aromatic content in the present specification means a value measured according to HS K2536 "Liquid petroleum products—Testing method of components (Fluorescent Indicator Adsorption Method)", unless otherwise specified.

From the viewpoint of flammability (prevention of smoke dust), it is preferred that the smoke point of the aviation fuel oil composition of the present embodiment should be 25 mm or higher; it is more preferred that this smoke point should be 27 mm or higher; and it is further preferred that this smoke point should be 30 mm or higher. In this context, the smoke point in the present specification means a value measured according to HS K2537 "Petroleum products—Kerosine and aviation turbine fuels—Determination of smoke point", unless otherwise specified.

From the viewpoint of corrosiveness, it is preferred that the sulfur content of the aviation fuel oil composition of the present embodiment should be 0.3 mass % or lower; it is more preferred that this sulfur content should be 0.2 mass % or lower; and it is further preferred that this sulfur content should be 0.1 mass % or lower. Moreover, likewise, from the viewpoint of corrosiveness, it is preferred that the mercaptan sulfur content should be 0.003 mass % or lower; it is more preferred that the mercaptan sulfur content should be 0.002 mass % or lower; and it is further preferred that the mercaptan sulfur content should be 0.001 mass % or lower. In this context, the sulfur content as referred to here means a value measured according to JIS K2541 "Crude Oil and Petroleum Products—Determination of sulfur content". Moreover, the mercaptan sulfur content in the present specification means a value measured according to JIS K2276 "Determination of mercaptan sulfur in light and middle distillates fuels (Potentiometric Method)", unless otherwise specified.

From the viewpoint of safety, it is preferred that the flash point of the aviation fuel oil composition of the present embodiment should be 38° C. or higher; it is more preferred that this flash point should be 40° C. or higher; and it is further preferred that this flash point should be 45° C. or higher. In this context, the flash point in the present specification means a value determined according to JIS K2265 "Crude Oil and Petroleum Products—Determination of flash point—Tag Closed Cup Method", unless otherwise specified.

From the viewpoint of corrosiveness, it is preferred that the total acid value of the aviation fuel oil composition of the present embodiment should be 0.1 mg KOH/g or lower; it is more preferred that this total acid value should be 0.08 mg KOH/g or lower; and it is further preferred that this total acid value should be 0.05 mg KOH/g or lower. In this context, the total acid value in the present specification means a value measured according to JIS K2276 "Determination of the Total Acid Value", unless otherwise specified.

From the viewpoint of preventing reduction in fuel supply attributed to fuel freezing under exposure to low temperatures during flight, it is preferred that the freezing point of the aviation fuel oil composition of the present embodiment should be –47° C. or lower; it is more preferred that this freezing point should be –48° C. or lower; and it is further preferred that this freezing point should be –50° C. or lower. In this context, the freezing point in the present specification means a value measured according to JIS K2276 "Determination of the freezing point of aviation fuels", unless otherwise specified.

From the viewpoint of prevention of fuel filter blockage attributed to deposit formation under exposure to high temperatures, etc., it is preferred that the thermal stability of the aviation fuel oil composition of the present embodiment should be 10.1 kPa or lower in terms of filter pressure drop and lower than 3 in terms of the tube deposit rating in preheating pipes in Method A, and 3.3 kPa or lower in terms of filter pressure drop and lower than 3 in terms of the tube deposit rating in preheating pipes in Method B. In this context, the thermal stability in the present specification means a value measured according to JIS K2276 "Determination of thermal oxidation stability of gas turbine fuels—JETOT method Method A, Method B", unless otherwise specified.

From the viewpoint of prevention of trouble attributed to the deposition of dissolved water under exposure to low temperatures, it is preferred that the water solubility of the aviation fuel oil composition of the present embodiment should be 2 or lower in a separated state and 1b or lower in an interfacial state. In this context, the water solubility in the present specification means a value measured according to JIS K2276 "Determination of the water reaction of aviation fuels", unless otherwise specified.

The aviation fuel oil base of the present embodiment containing a low environmental load-type base, produced with the animal or vegetable oil and fat as a raw material, and the aviation fuel oil composition of the present embodiment are excellent in all of flammability, oxidation stability, and life cycle $CO_2$ emission characteristics.

Although a preferred embodiment of the present invention was described above, the present invention is in no way limited to that embodiment.

EXAMPLES

The contents of the present invention will now be specifically described with reference to examples and comparative examples. However, the present invention is in no way limited to the following examples.

[Catalyst Preparation]

<Catalyst A>

18.0 g of No. 3 water glass was charged into 3,000 g of aqueous sodium aluminate containing 5 mass % of sodium aluminate, and the resultant mixture was placed in a container maintained at a temperature of 65° C. (this mixture will be referred to as "solution a"). Separately to this, in a separate container maintained at a temperature of 65° C., 6.0 g of phosphoric acid (concentration: 85 mass %) was charged into 3,000 g of aqueous aluminum sulfate containing 2.5 mass % of aluminum sulfate to prepare a solution. The above solution a was added dropwise into this solution to prepare a mixed solution. This process was stopped when the pH of the mixed solution reached 7.0, whereby a slurry-like product was obtained. This product was filtered through a filter, and the solid matter was removed to obtain a cake-like slurry.

This slurry in a cake state was transferred to a container equipped with a reflux condenser, 150 ml of distilled water and 10 g of 27 mass % of an aqueous ammonia solution were added to the container, and stirring was performed with heating at 75° C. for 20 hours. After the stirring, the slurry was placed in a kneading apparatus, and kneading was performed with moisture removal by heating to 80° C. or higher to obtain a kneading product in a clay form. The obtained kneading product was extruded into a cylinder form of 1.5 mm in diameter using an extrusion machine, dried at 110° C. for 1 hour, and then calcined at 550° C. to obtain an extruded support.

50 g of the obtained extruded support was placed in an eggplant-shaped flask, and an impregnation solution obtained by formulating 17.3 g of molybdenum trioxide, 13.2 g of nickel(II) nitrate hexahydrate, 3.9 g of phosphoric acid (concentration: 85 mass %), and 4.0 g of malic acid was injected into the eggplant-shaped flask with deaeration using a rotary evaporator. A specimen obtained by impregnating the extruded support in an impregnation solution was dried for 1 hour at 120° C., and then calcined at 550° C. in an air atmosphere to obtain a catalyst A. The physical properties of the catalyst A are as shown in Table 1.

<Catalyst B-1>

Based on the method described in a non-patent document (Appl. Catal. A, 299 (2006), pp. 167 to 174), ZSM-48 zeolite was synthesized. The synthesized ZSM-48 zeolite was dried under an air flow for 3 hours at 95° C., and then calcined for 3 hours at 550° C. in an air atmosphere to obtain calcined zeolite.

As an alumina binder, a commercially-available boehmite powder (trade name: Cataloid-AP) was prepared. An appropriate amount of water was added to form a boehmite powder slurry. In this slurry, the calcined zeolite and the boehmite powder were thoroughly kneaded so that zeolite:alumina was 70:30 (mass %), to obtain a kneaded product. This kneaded product was fed into an extrusion molding machine to obtain a cylindrical extruded support (diameter: 1.5 mm, length: 1 cm). The obtained extruded support was dried under an air flow for 3 hours at 95° C., and then calcined for 3 hours at 550° C. in an air atmosphere.

50 g of the calcined extruded support was placed in an eggplant-type flask. While deaerating with a rotary evacuator, dinitrodiamino platinum and dinitrodiamino palladium were added. These were impregnated into the extruded support to obtain an impregnated specimen. The impregnation amounts were adjusted so that, based on the obtained catalyst, the supported amounts of platinum and palladium were respectively 0.3 mass % and 0.3 mass %. The impregnated specimen was dried for 1 hour at 120° C. in an air atmosphere, and then calcined at 550° C. in an air atmosphere to obtain a catalyst B-1. The physical properties of the catalyst B-1 are shown in Table 1.

<Catalyst B-2>

Based on the method described in U.S. Pat. No. 4,868,146, ZSM-23 zeolite was synthesized. The synthesized ZSM-23 zeolite was dried under an air flow for 3 hours at 95° C., and then calcined for 3 hours at 550° C. in an air atmosphere to obtain calcined zeolite.

As an alumina binder, a commercially-available boehmite powder (trade name: Cataloid-AP) was prepared. An appropriate amount of water was added to form a boehmite powder slurry. In this slurry, the calcined zeolite and the boehmite powder were thoroughly kneaded so that zeolite:alumina was 70:30 (mass %), to obtain a kneaded product. This kneaded product was fed into an extrusion molding machine to obtain a cylindrical extruded support (diameter: 1.5 mm, length: 1 cm). The obtained extruded support was dried under an air flow for 3 hours at 95° C., and then calcined for 3 hours at 550° C. in an air atmosphere.

50 g of the calcined extruded support was placed in an eggplant-type flask. While deaerating with a rotary evacuator, dinitrodiamino platinum and dinitrodiamino palladium were added. These were impregnated into the extruded support to obtain an impregnated specimen. The impregnation amounts were adjusted so that, based on the obtained catalyst, the supported amounts of platinum and palladium were 0.3 mass % and 0.3 mass %, respectively. The impregnated specimen was dried for 1 hour at 120° C. in an air atmosphere, and then calcined at 550° C. again under an air flow to obtain a catalyst B-2. The physical properties of the catalyst B-2 are shown in Table 1.

<Catalyst B-3>

Based on the method described in a non-patent document (Chem. Commun. 3303, 2007), ZSM-22 zeolite was synthesized. The synthesized ZSM-22 zeolite was dried under an air flow for 3 hours at 95° C., and then calcined for 3 hours at 550° C. in an air atmosphere to obtain calcined zeolite.

As an alumina binder, a commercially-available boehmite powder (trade name: Cataloid-AP) was prepared. An appropriate amount of water was added to form a boehmite powder slurry. In this slurry, the calcined zeolite and the boehmite powder were thoroughly kneaded so that zeolite:alumina was 70:30 (mass %), to obtain a kneaded product. This kneaded product was fed into an extrusion molding machine to obtain a cylindrical extruded support (diameter: 1.5 mm, length: 1 cm). The obtained extruded support was dried under an air flow for 3 hours at 95° C., and then calcined for 3 hours at 550° C. in an air atmosphere.

50 g of the calcined extruded support was placed in an eggplant-type flask. While deaerating with a rotary evacuator, dinitrodiamino platinum and dinitrodiamino palladium were added. These were impregnated into the extruded support to obtain an impregnated specimen. The impregnation amounts were adjusted so that, based on the obtained catalyst, the supported amounts of platinum and palladium were respectively 0.3 mass % and 0.3 mass %. The impregnated specimen was dried for 1 hour at 120° C. in an air atmosphere, and then calcined at 550° C. in an air atmosphere to obtain a catalyst B-3. The physical properties of the catalyst B-3 are shown in Table 1.

<Catalyst B-4>

50 g of a silica alumina support having a silica-alumina ratio (mass ratio) of 70:30 was placed in an eggplant-type flask. While deaerating with a rotary evacuator, an aqueous solution of dinitrodiamino platinum was charged into the eggplant-type flask, so that the aqueous solution of dinitrodiamino platinum was impregnated into the silica alumina support to obtain an impregnated specimen. The impregnated specimen was dried for 1 hour at 110° C. in an air atmosphere, and then calcined at 350° C. to obtain a catalyst B-4. The supported amount of platinum in the catalyst B-4 was 0.3 mass % based on the total catalyst amount. The physical properties of the catalyst B-4 are shown in Table 1.

TABLE 1

|  | Catalyst A | Catalyst B-1 | Catalyst B-2 | Catalyst B-3 | Catalyst B-4 |
|---|---|---|---|---|---|
| $Al_2O_3$ Content (mass %, based on support mass) | 91.2 | 30 | 30 | 30 | 30 |
| $SiO_2$ Content (mass %, based on support mass) | 4.8 | 0 | 0 | 0 | 70 |
| $P_2O_5$ Content (mass %, based on support mass) | 4 | 0 | 0 | 0 | 0 |
| Crystalline Solid Acidic Substance Content (mass %, based on support mass) | — | 70 | 70 | 70 | 0 |
| Type of Crystalline Solid Acidic Substance | — | MRE | MTT | TON | — |
| $MoO_3$ Content (mass %, based on catalyst mass) | 24 | 0 | 0 | 0 | 0 |
| NiO Content (mass %, based on catalyst mass) | 2.6 | 0 | 0 | 0 | 0 |
| Pt Content (mass %, based on catalyst mass) | 0 | 0.3 | 0.3 | 0.3 | 0.3 |
| Pd Content (mass %, based on catalyst mass) | 0 | 0.3 | 0.3 | 0.3 | 0 |

[Production of Aviation Fuel Oil Base]

Example 1

A reaction tube (inner diameter 20 mm) filled with catalyst A (100 mL) was arranged in the countercurrent flow in a fixed fluidized bed system reaction apparatus. Subsequently, pre-sulfiding of the catalyst was carried out for 4 hours using straight-nm gas oil (sulfur concentration: 3 mass %) to which dimethyl disulfide was added under conditions of a catalyst layer average temperature of 300° C., a hydrogen partial pressure of 6 MPa, a liquid hourly space velocity of 1 h$^{-1}$, and a hydrogen/oil ratio of 200 NL/L.

After the presulfiding, a feedstock was prepared by adding dimethyl sulfide to a mixed oil of a vegetable oil and fat 1 having the properties shown in Table 2 and a recycled oil, and fed into the reaction tube. The recycled oil is a hydrotreated oil after the below-described high-pressure separator introduction. The mass ratio of the recycled oil to the vegetable oil and fat 1 was 1 (recycled amount: 1 times mass). Further, the added amount of the dimethyl sulfide was an amount so that the sulfur content (in terms of sulfur atoms) was 10 mass ppm based on the feedstock.

Subsequently, the feedstock was fed into the above-described fixed fluidized bed system reaction apparatus, and a hydrotreatment was carried out (first step). The 15° C. density of the feedstock was 0.900 g/mL, and the oxygen content was 11.5 mass %. Further, the conditions of the hydrotreatment were a catalyst layer average temperature (reaction temperature) of 315° C., a hydrogen pressure of 4.8 MPa, a liquid hourly space velocity of 1.25 h$^{-1}$, and a hydrogen/oil ratio of 506 NL/L. The treated oil which had been hydrotreated in the reaction tube was introduced into a high-pressure separator. In this high-pressure separator, hydrogen, hydrogen sulfide, carbon dioxide, and water were removed from the treated oil.

A part of the treated oil introduced into the high-pressure separator was cooled to 40° C. by heat-exchange with cooling water, recycled to the raw material feed side as described above as recycled oil, and fed into the reaction tube along with the vegetable oil and fat 1 which is the feedstock.

Next, a hydroisomerization reaction (second step) was carried out as follows by arranging a reaction tube (inner diameter 20 mm) filled with catalyst B-1 (150 mL) in a fixed fluidized bed system reaction apparatus (isomerization apparatus), and feeding the remaining treated oil (first generated oil) other than the recycled oil into the fixed fluidized bed system reaction apparatus.

Before feeding the treated oil to the fixed fluidized bed system reaction apparatus, the catalyst B-1 was subjected to a reduction treatment under conditions of a catalyst layer average temperature of 350° C., a hydrogen pressure of 4.8 MPa, and a hydrogen gas amount of 83 mL/min. Then, the treated oil was fed into the fixed fluidized bed system reaction apparatus, and an isomerization treatment was carried out under conditions of a catalyst layer average temperature (reaction temperature) of 320° C., a hydrogen pressure of 4.8 MPa, a liquid hourly space velocity of 1 h$^{-1}$, and a hydrogen/oil ratio of 506 NL/L to obtain an isomerized oil (second generated oil). The isomerized oil was introduced into a rectifying column, and a light fraction having a boiling range of less than 140° C., a middle fraction of 140 to 300° C., and a heavy fraction of more than 280° C. were distilled. This middle fraction can be used as an aviation fuel oil base. The hydrotreatment conditions in the second step are shown in Table 3 and the properties of the obtained aviation fuel oil base are shown in Table 4, respectively.

Example 2

An isomerized oil was obtained in the same manner as in Example 1, except that vegetable oil and fat 2 having the properties shown in Table 2 was used instead of vegetable oil and fat 1, and the conditions of the first step and the second step were carried out based on the conditions shown in Table 3. The conditions of the first step and the second step are shown in Table 3, and the properties of the obtained middle fraction (aviation fuel oil base) by distilling the obtained isomerized oil are shown in Table 4, respectively.

Example 3

An isomerized oil was obtained in the same manner as in Example 1, except that vegetable oil and fat 2 having the properties shown in Table 2 was used instead of vegetable oil and fat 1, the catalyst B-2 was used instead of the catalyst B-1 in the second step, and the conditions of the first step and the second step were carried out based on the conditions shown in Table 3. The conditions of the first step and the second step are shown in Table 3, and the properties of the obtained middle fraction (aviation fuel oil base) by distilling the obtained isomerized oil are shown in Table 4, respectively.

Example 4

An isomerized oil was obtained in the same manner as in Example 1, except that vegetable oil and fat 2 having the properties shown in Table 2 was used instead of vegetable oil and fat 1, the catalyst B-3 was used instead of the catalyst B-1 in the second step, and the conditions of the first step and the second step were carried out based on the conditions shown in Table 3. The conditions of the first step and the second step are shown in Table 3, and the properties of the obtained middle fraction (aviation fuel oil base) by distilling the obtained isomerized oil are shown in Table 4, respectively.

Comparative Example 1

An isomerized oil was obtained in the same manner as in Example 1, except that vegetable oil and fat 2 having the properties shown in Table 2 was used instead of vegetable oil and fat 1, the catalyst B-4 was used instead of the catalyst B-1 in the second step, and the conditions of the first step and the second step were carried out based on the conditions shown in Table 3. The conditions of the first step and the second step are shown in Table 3, and the properties of the obtained middle fraction (aviation fuel oil base) by distilling the obtained isomerized oil are shown in Table 4, respectively.

TABLE 2

| | | Vegetable Oil and Fat 1 (coconut oil) | Vegetable Oil and Fat 2 (palm oil) | Petroleum-based Aviation Fuel Base |
|---|---|---|---|---|
| Density at 15° C. (kg/m$^3$) | | 900 | 916 | 790 |
| Kinematic Viscosity at 30° C. (mm$^2$/s) | | — | — | 1.3 |
| Elemental Analysis | C (mass %) | 77.0 | 77.3 | 85.0 |
| | H (mass %) | 12.0 | 12.0 | 15.0 |
| | Oxygen Content (mass %) | 11.5 | 10.6 | <0.1 |
| Sulfur Content (mass ppm) | | 3 | 2 | 4 |
| Acid Value (mgKOH/g) | | 0.10 | 0.07 | 0.00 |
| Composition Ratio (mass %) of Fatty Acid Groups in Oil and Fat (number of carbon atoms in fatty acid carbon chain) | Butyric Acid Group (C3) | 0 | 0 | — |
| | Caproic Acid Group (C5) | 0 | 0 | — |
| | Caprylic Acid Group (C7) | 4 | 0 | — |
| | Capric Acid Group (C9) | 4 | 0 | — |
| | Lauric Acid Group (C11) | 49 | 0 | — |
| | Myristic Acid Group (C13) | 17 | 1 | — |
| | Palmitic Acid Group (C14) | 9 | 44 | — |
| | Stearic Acid Group (C16) | 3 | 5 | — |
| | Oleic Acid Group (C17) | 7 | 39 | — |
| | Linoleic Acid Group (C17) | 2 | 10 | — |
| | Linolenic Acid Group (C17) | 0 | 0 | — |

TABLE 3

| | | | Example 1 | Example 2 | Example 3 | Example 4 | Comparative Example 1 |
|---|---|---|---|---|---|---|---|
| First Step | Feedstock | | Vegetable Oil and Fat 1 | Vegetable Oil and Fat 2 | Vegetable Oil and Fat 2 | Vegetable Oil and Fat 2 | Vegetable Oil and Fat 2 |
| | Added Amount of Sulfur-containing Hydrocarbon Compound (based on raw oil) | mass ppm | 48 | 45 | 47 | 40 | 43 |
| | Catalyst Type | | Catalyst A | Catalyst A | Catalyst A | Catalyst A | Catalyst A |
| | Reaction Temperature (catalyst layer average temperature) | ° C. | 315 | 305 | 305 | 305 | 305 |
| | Hydrogen Pressure | MPa | 4.8 | 4.8 | 4.8 | 4.8 | 4.8 |
| | LHSV | h$^{-1}$ | 1.25 | 1.25 | 1.25 | 1.25 | 1.25 |
| | Hydrogen/Oil Ratio | NL/L | 506 | 506 | 506 | 506 | 506 |
| | Quench Hydrogen | | Yes | Yes | Yes | Yes | Yes |
| | Recycled Amount | times mass | 1 | 1 | 1 | 1 | 1 |
| Second Step | Catalyst Type | | Catalyst B-1 | Catalyst B-1 | Catalyst B-2 | Catalyst B-3 | Catalyst B-4 |
| | Reaction Temperature (catalyst layer average temperature) | ° C. | 320 | 318 | 325 | 322 | 330 |
| | Hydrogen Pressure | MPa | 4.8 | 4.8 | 4.8 | 4.8 | 4.8 |
| | LHSV | h$^{-1}$ | 1 | 1 | 1 | 1 | 1 |
| | Hydrogen/Oil Ratio | NL/L | 506 | 506 | 506 | 506 | 506 |

TABLE 4

|  |  | Example 1 | Example 2 | Example 3 | Example 4 | Comparative Example 1 |
|---|---|---|---|---|---|---|
| Middle Fraction (aviation fuel oil base) |  | Aviation Fuel Oil Base 1 | Aviation Fuel Oil Base 2 | Aviation Fuel Oil Base 3 | Aviation Fuel Oil Base 4 | Aviation Fuel Oil Base 5 |
| Boiling Range | °C. | 149.5-273.5 | 202.0-258.0 | 199.5-260.0 | 200.5-259.5 | 200.0-250.0 |
| Density @15° C. | g/cm$^3$ | 0.758 | 0.761 | 0.751 | 0.756 | 0.755 |
| Cloud Point | °C. | −40 | −45 | −41 | −43 | −30 |
| Isomerization Ratio | mass % | 90.0 | 95.5 | 95.3 | 96.6 | 96.7 |
| Cracking Ratio | mass % | 20 | 12 | 14 | 12 | 40 |
| Base Yield | mass % | 80 | 83 | 81 | 83 | 57 |

In Examples 1 to 4, an aviation fuel oil base could be obtained which had a high isomerization ratio, a low cracking ratio, and a high base yield, and which had excellent low-temperature performance. The composition ratio of the fatty acid base was determined based on a standard oil and fat analysis test method (set by the Japan Oil Chemists' Society) (1993) "2.4.21.3-77 Fatty Acid Composition (FID Programmed Temperature Gas Chromatography)" using a programmed temperature gas chromatograph equipped with a hydrogen flame ionization detector (FID) of a methyl ester prepared based on a standard oil and fat analysis test (set by the Japan Oil Chemists' Society) (1991) "2.4.2-91 Fatty Acid Methyl Ester Preparation Method (boron trifluoride-methanol method"). In addition, the isomerization ratio, cracking ratio, and base yield in Table 4 were determined based on the following equations.

Isomerization ratio(mass %)=(Total mass of isoparaffin included in the generated oil of the second step excluding cracked content/Total mass of normal paraffin included in the raw oil of the second step)×100

Cracking ratio(mass %)=(Total mass of hydrocarbons included in the generated oil of the second step having a smaller number of carbon atoms than the number of carbon atoms of the hydrocarbons included in the raw oil of the second step/Total mass of the raw oil of the second step)×100

Base yield(mass %)={(Total amount of second step generated oil—cracked content—fraction amount having a boiling point of 300° C. or more included in the generated oil of the second step)/Second step raw oil}×100

Here, "cracked content" refers to the total amount of hydrocarbons included in the generated oil of the second step having a smaller number of carbon atoms than the number of carbon atoms of the hydrocarbons included in the raw oil of the second step. For example, when the vegetable oil and fat 1 is treated, the minimum number of carbon atoms of the hydrocarbons included in the generated oil of the second step is 7, and at this time the cracking content means the total amount of hydrocarbons having six carbon atoms or less included in the raw oil of the second step.

[Production of Aviation Fuel Oil Composition]

Examples 5 to 10 and Comparative Example 2

The aviation fuel oil bases 1 to 5 and a petroleum-based aviation fuel oil base having the blended amounts shown in Table 5 (hydrodesulfurized bases of straight-run kerosene obtained from an atmospheric distillation apparatus of crude oil at a reaction temperature of 320° C., a hydrogen pressure of 3 MPa, an LHSV of 3.0 h$^−$, and a hydrogen/oil ratio of 150 NL/L; properties are shown in Table 2) were blended to obtain the aviation fuel oil compositions of Examples 5 to 10 and Comparative Example.

TABLE 5

|  |  | Example 5 | Example 6 | Example 7 | Example 8 | Example 9 | Example 10 | Comparative Example 2 | Petroleum-based Aviation Fuel Oil |
|---|---|---|---|---|---|---|---|---|---|
| Aviation Fuel Oil Base 1 | vol % | 25 |  |  |  |  |  |  |  |
| Aviation Fuel Oil Base 2 | vol % |  | 50 | 25 | 10 |  |  |  |  |
| Aviation Fuel Oil Base 3 | vol % |  |  |  |  | 25 |  |  |  |
| Aviation Fuel Oil Base 4 |  |  |  |  |  |  | 25 |  |  |
| Aviation Fuel Oil Base 5 |  |  |  |  |  |  |  | 25 |  |
| Petroleum-based Aviation Fuel Oil Base | vol % | 75 | 50 | 75 | 90 | 75 | 75 | 75 | 100 |
| Density @15° C. | g/cm$^3$ | 0.783 | 0.776 | 0.783 | 0.787 | 0.780 | 0.782 | 0.781 | 0.788 |
| Flash Point | °C. | 57 | 71 | 59 | 49 | 58 | 60 | 60 | 46 |
| Sulfur Content | mass ppm | 3 | 2 | 3 | 4 | 3 | 3 | 3 | 4 |
| Mercaptan Sulfur Content | mass % | <0.001 | <0.001 | <0.001 | <0.001 | <0.001 | <0.001 | <0.001 | <0.001 |
| Aromatic Content | vol % | 13 | 8 | 12 | 15 | 9 | 7 | 7 | 17 |
| Total Acid Value | mgKOH/g | 0.01 |  | 0.01 | 0.01 | 0.01 | 0.01 | 0.01 | 0.01 |
| Freezing Point | °C. | −48 | −47 | −48 | −49 | −48 | −47 | −41 | −49 |
| Smoke Point | mm | 29 | 33 | 28 | 26 | 29 | 28 | 29 | 25 |
| Kinematic Viscosity (@−20° C.) |  | 3.30 | 4.50 | 4.10 | 3.50 | 4.20 | 4.10 | 4.40 | 3.38 |
| Net Heat of Combustion | MJ/kg | 43.5 | 44.2 | 43.6 | 43.1 | 44 | 43.3 | 43.3 | 43.4 |
| Corrosiveness to copper (50° C., 4 hr) |  | 1 | 1 | 1 | 1 | 1 | 1 | 1 | 1 |
| Conductivity |  | 210 | 200 | 210 | 250 | 200 | 230 | 210 | 210 |
| Existent Gum Content | mg/100 ml | <1 | <1 | <1 | <1 | <1 | <1 | <1 | <1 |
| Water Reaction |  |  |  |  |  |  |  |  |  |
| Separated State |  | 1 | 1 | 1 | 1 | 1 | 1 | 1 | 1 |
| Interface State |  | 1b | 1b | 1b | 1b | 1b | 1b | 1b | 1b |

TABLE 5-continued

|  | | Example 5 | Example 6 | Example 7 | Example 8 | Example 9 | Example 10 | Comparative Example 2 | Petroleum-based Aviation Fuel Oil |
|---|---|---|---|---|---|---|---|---|---|
| Thermal Oxidation Stability | | | | | | | | | |
| Filter Pressure Drop | kPa | 0 | 0 | 0 | 0 | 0 | 0 | 0 | 0 |
| Tube Deposit Rating | | <1 | <1 | <1 | <1 | <1 | <1 | <1 | <1 |

It was confirmed that the aviation fuel oil compositions of Examples 5 to 10 produced using the aviation fuel oil bases of Examples 1 to 4 had a lower freezing point and superior low-temperature performance than the aviation fuel oil composition of Comparative Example 2 produced using the aviation fuel oil base of Comparative Example 1 (which used a conventional isomerization catalyst).

The invention claimed is:

1. A method for producing an aviation fuel oil base, comprising:
   first obtaining a first generated oil by hydrotreating a feedstock which contains an oxygen-containing hydrocarbon compound derived from an animal or vegetable oils and fat by bringing the feedstock into contact with a first dual functional catalyst which has dehydrogenation and hydrogenation functions and which comprises a metal of group 6B of the periodic table, a metal of group 8, and an amorphous solid acidic substance, in the presence of hydrogen, wherein the feedstock contains 1 to 100 mass ppm in terms of sulfur atoms of a sulfur-containing hydrocarbon compound, and wherein the sulfur content included in the first generated oil is 10 mass ppm or less; and
   then obtaining a second generated oil comprising an aviation fuel oil base by hydroisomerizing the first generated oil by bringing the first generated oil into contact with a second dual functional catalyst which has dehydrogenation and hydrogenation functions and which comprises a metal of group 8 of the periodic table and a crystalline solid acidic substance, in the presence of hydrogen;
   wherein the cracking ratio is no greater than 20 mass % when obtaining the second generated oil by hydroisomerizing the first oil.

2. The method for producing an aviation fuel oil base according to claim 1, wherein the metal of group 6B of the periodic table in the first dual functional catalyst is molybdenum and/or tungsten, and
   the metal of group 8 of the periodic table in the first dual functional catalyst is cobalt and/or nickel, and
   wherein the method comprises sulfiding the first dual functional catalyst, before the bringing the feedstock into contact with a first dual functional catalyst.

3. The method for producing an aviation fuel oil base according to claim 1, wherein the crystalline solid acidic substance in the second dual functional catalyst is a crystalline substance comprising at least one crystal selected from the group consisting of a one-dimensional, 10-member ring aluminosilicate having an MEL structure, a TON structure, an MTT structure, and an MRE structure, and a silicoaluminophosphate having an AEL structure.

4. The method for producing an aviation fuel oil base according to claim 1, wherein
   the crystalline solid acidic substance in the second dual functional catalyst comprises a one-dimensional, 10-member ring aluminosilicate and/or a silicoaluminophosphate, and
   a total content of the one-dimensional, 10-member ring aluminosilicate and the silicoaluminophosphate is 65 to 85 mass %.

5. The method for producing an aviation fuel oil base according to claim 3, wherein the one-dimensional, 10-member ring aluminosilicate comprises at least one selected from the group consisting of ZSM-11, ZSM-22, ZSM-23, and ZSM-48, and
   the silicoaluminophosphate comprises at least one selected from the group consisting of SAPO-11 and SAPO-34.

6. The method for producing an aviation fuel oil base according to claim 1, wherein a hydroisomerization ratio exceeds 90 mass %.

7. An aviation fuel oil composition, containing a first aviation fuel oil base obtained by the method for producing an aviation fuel oil base according to claim 1 and a second aviation fuel oil base produced from a petroleum-based feedstock, wherein
   a content of the first aviation fuel oil base is 5 to 50 mass % and a content of the second aviation fuel oil base is 50 to 95 mass %.

8. The method for producing an aviation fuel oil base according to claim 4, wherein the one-dimensional, 10-member ring aluminosilicate comprises at least one selected from the group consisting of ZSM-11, ZSM-22, ZSM-23, and ZSM-48, and
   the silicoaluminophosphate comprises at least one selected from the group consisting of SAPO-11 and SAPO-34.

9. An aviation fuel oil composition, containing a first aviation fuel oil base obtained by the method for producing an aviation fuel oil base according to claim 1 and a second aviation fuel oil base produced from a petroleum-based feedstock, wherein
   a content of the first aviation fuel oil base is 5 to 50 mass % and a content of the second aviation fuel oil base is 50 to 95 mass %.

* * * * *